United States Patent
Yang et al.

(10) Patent No.: US 10,707,515 B2
(45) Date of Patent: Jul. 7, 2020

(54) SYSTEM AND METHOD FOR PRODUCING HIGH-PURITY AND HIGH-ACTIVITY VANADIUM ELECTROLYTE

(71) Applicants: INSTITUTE OF PROCESS ENGINEERING, CHINESE ACADEMY OF SCIENCES, Beijing (CN); BEIJING ZHONGKAIHONGDE TECHNOLOGY CO., LTD, Beijing (CN)

(72) Inventors: Haitao Yang, Beijing (CN); Qingshan Zhu, Beijing (CN); Chuanlin Fan, Beijing (CN); Qixun Ban, Beijing (CN)

(73) Assignees: INSTITUTE OF PROCESS ENGINEERING, CHINESE ACADEMY OF SCIENCES, Beijing (CN); BEIJING ZHONGKAIHONGDE TECHNOLOGY CO., LTD, Beijing (CN)

( * ) Notice: Subject to any disclaimer, the term of this patent is extended or adjusted under 35 U.S.C. 154(b) by 130 days.

(21) Appl. No.: 16/073,908

(22) PCT Filed: Jan. 16, 2017

(86) PCT No.: PCT/CN2017/071205
§ 371 (c)(1),
(2) Date: Jul. 30, 2018

(87) PCT Pub. No.: WO2017/128967
PCT Pub. Date: Aug. 3, 2017

(65) Prior Publication Data
US 2019/0044172 A1    Feb. 7, 2019

(30) Foreign Application Priority Data
Jan. 28, 2016    (CN) .......................... 2016 1 0060028

(51) Int. Cl.
*H01M 8/18*    (2006.01)
*B01J 8/00*    (2006.01)
(Continued)

(52) U.S. Cl.
CPC .......... *H01M 8/188* (2013.01); *B01J 8/0055* (2013.01); *B01J 8/1827* (2013.01); *B01J 14/00* (2013.01);
(Continued)

(58) Field of Classification Search
CPC ........ H01M 8/18; H01M 8/188; B01J 8/0055; B01J 8/1827; B01J 14/00; B01J 19/0013; B01J 19/245
See application file for complete search history.

(56) References Cited

U.S. PATENT DOCUMENTS 10,053,371 B2 *   8/2018   Fan ..................... C01G 31/02
10,099,939 B2 *   10/2018  Fan ..................... C01B 7/035
(Continued)

FOREIGN PATENT DOCUMENTS

CN          103515642 A   *   1/2014
WO          WO-8905363 A1  *   6/1989   ............. C22B 3/045

*Primary Examiner* — Amanda C. Walke
(74) *Attorney, Agent, or Firm* — Bayramoglu Law Offices LLC

(57) ABSTRACT

A system and method for producing a high-purity and high-activity vanadium electrolyte, comprising converting high-purity vanadium oxytrichloride into an ammonium salt in a fluidized bed by gas phase ammoniation, then in another fluidized bed, reducing the ammonium salt into a low-valence vanadium oxide having an average vanadium valence of 3.5, adding clean water and sulfuric acid for dissolution, and further performing activation by ultrasound to obtain a 3.5-valence vanadium electrolyte which can be directly used in a new all-vanadium redox flow battery stack. The method of producing an ammonium salt containing vanadium in the fluidized bed by gas phase ammoniation is of short process and high efficiency. Precise regulation of the valence state of the reduction product is implemented by arranging an internal member in the reduction fluidized bed, (Continued)

and ultrasonication is used to activate the vanadium ion, thereby greatly improving the activity of the electrolyte.

10 Claims, 1 Drawing Sheet

(51) Int. Cl.
*B01J 8/18* (2006.01)
*B01J 14/00* (2006.01)
*B01J 19/00* (2006.01)
*B01J 19/24* (2006.01)
*C01G 31/02* (2006.01)

(52) U.S. Cl.
CPC ......... *B01J 19/0013* (2013.01); *B01J 19/245* (2013.01); *C01G 31/02* (2013.01); *H01M 8/18* (2013.01); *B01J 2208/00752* (2013.01); *B01J 2208/00761* (2013.01); *B01J 2219/00074* (2013.01); *H01M 2300/0011* (2013.01); *Y02E 60/528* (2013.01)

(56) References Cited

U.S. PATENT DOCUMENTS

| 10,112,846 | B2 * | 10/2018 | Zhu | B01J 8/0015 |
| 10,125,024 | B2 * | 11/2018 | Zhu | B01F 15/0235 |
| 10,294,118 | B2 * | 5/2019 | Zhu | B01D 3/14 |

* cited by examiner

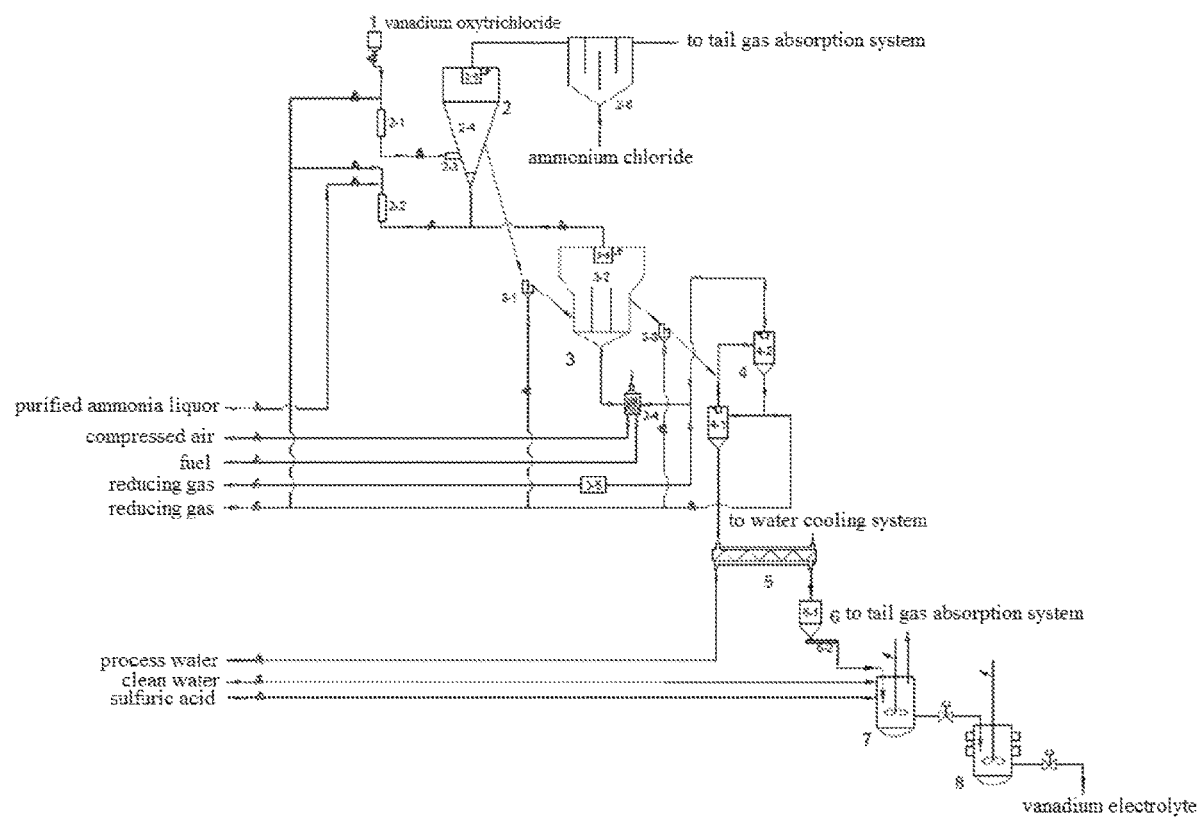

SYSTEM AND METHOD FOR PRODUCING HIGH-PURITY AND HIGH-ACTIVITY VANADIUM ELECTROLYTE

CROSS REFERENCE TO RELATED APPLICATIONS

This application is based is based upon and claims priority to PCT Application Number PCT/CN2017/071205, filed on Jan. 16, 2017, which stems from Chinese Application Number 2016100600283 filed on Jan. 28, 2016, both of which are incorporated herein by reference in their entirety.

TECHNICAL FIELD

The present invention relates to the fields of energy and chemical engineering, and more particularly to a system and method for producing a high-purity and high-activity vanadium electrolyte.

BACKGROUND

Traditional fossil fuels have always been the main source of energy, however, long-term exploitation and heavy use results in depletion of resources and also brings about serious environmental pollution. The development and utilization of clean renewable energy sources such as wind, water, solar, and tidal energies have gradually attracted the attention of human society. However, renewable energy sources are difficult to be effectively used by the existing energy management systems due to their inherent intermittence.

Energy storage technology is one of ways to solve such problems. In various kinds of energy storage systems, the all-vanadium redox flow battery (VRB) is an attractive energy storage device. The biggest advantage of VRB is its flexibility—power and energy storage capacity are independent. The power of VRB depends on the number of battery cells and the effective electrode area of battery cells, while the energy storage capacity depends on the concentration of the active material in the electrolyte and the volume of the electrolyte. Each battery cell consists of two electrode chambers (positive and negative electrode chambers) separated by a proton exchange membrane. The electrolyte, that is the sulfate solution of vanadium, is used to store energy. When the electrolyte flows through the battery cell, redox reactions of V(IV)/V(V) and V(II)/V(III) occur in the positive and negative electrode chambers, respectively. The vanadium electrolyte is a vital component of the all-vanadium redox flow battery.

The new vanadium battery stack is generally configured using a mixed vanadium electrolyte with a concentration ratio of V(III) to V(IV) of 1:1, that is, the average valence of vanadium ions in the electrolyte is 3.5. Such electrolyte can be directly added to the positive and negative electrode chambers for use, which is easy to operate. The purity of the vanadium electrolyte plays a crucial role in performances of the battery, and high concentration of impurities in the electrolyte will bring about the following problems: (1) there is a competitive reaction between impurity ions and vanadium ions, which reduces the efficiency of the battery. (2) In the positive electrode chamber, impurity ions are deposited on the graphite felt electrode, which results in the blockage of the gap in the graphite felt and reduction of the specific surface area of the graphite felt, thus affecting charge and discharge efficiencies. (3) In the negative electrode chamber, impurity ions will affect the hydrogen evolution over-potential, and the production of the gas will affect the pressure balance inside the battery. (4) Impurity ions reduce the lifetime of the proton exchange membrane. (5) Impurity ions affect the stability of vanadium ions, leading to premature aging of the electrolyte.

The activity of the vanadium electrolyte refers to the effective concentration of the vanadium ions in the electrolyte that can be used for charge and discharge. The vanadium ions in the electrolyte are affected by the temperature, impurities, etc., and an oxygen-bridge bond will be formed, which results in the production of polycondensation, and the reduction of the electrochemical activity. Therefore, increasing the activity of the vanadium electrolyte can effectively improve the utilization efficiency of the vanadium resources, thus reducing the cost of the vanadium battery.

The methods for preparing the VRB electrolyte are as follows: (1) $VOSO_4$ method: U.S. Pat. No. 849,094 discloses a mixed vanadium electrolyte with a concentration ratio of V(III) to V(IV) of 1:1, which is prepared by dissolving $VOSO_4$ in a sulfuric acid solution, and then adjusting the valence state electrochemically. The main problem of this method lies in the more complicated preparation process of $VOSO_4$ and high price, which is not conducive to the large-scale application in VRB. $VOSO_4$ is difficult to be highly purified, thus the electrolyte prepared by such process contains more impurities. Electrochemical treatment is required to adjust the concentration ratio of V(III) to V(IV) to 1:1, so that the average valence of vanadium ions in the electrolyte is 3.5. (2) Chemical reduction method: Chinese patent CN101562256 discloses a mixed vanadium electrolyte of V(III) and V(IV), which is prepared by adding a reducing agent such as oxalic acid, butyraldehyde, etc. to the mixed system of $V_2O_5$ and a sulfuric acid solution, and keeping the mixture at 50-100° C. for 0.5-10 hours for chemical reduction. The main problem of the method lies in that it is not easy to achieve the precise control over the degree of reduction. $V_2O_5$ prepared by the existing process is difficult to be highly purified, and the electrolyte prepared by such process contains more impurities. Addition of the reducing agent will introduce a new impurity into the vanadium electrolyte system, thereby affecting the purity of the electrolyte. (3) Electrolytic method: International PCT patent AKU88/000471 describes a mixed vanadium electrolyte with a concentration ratio of V(III) to V(IV) of 1:1, which is prepared by adding the activated $V_2O_5$ to a sulfuric acid solution, and then performing constant current electrolysis. Preparation of the vanadium electrolyte by the electrolytic method is suitable for large-scale production of the electrolyte, but the process requires a preliminary activating treatment, which needs an additional electrolysis device and consumes electrical energy. Also, there is the problem of the electrolyte containing more impurities. (4) Method by dissolving a low-valence vanadium oxide: Chinese patent CN101728560A discloses that the high-purity $V_2O_3$ is used as a raw material and dissolved in 1:1 dilute sulfuric acid at a temperature of 80-150° C. to prepare a solution of $V_2(SO_4)_3$ used as a negative electrode electrolyte. The main problem of the process lies in that it is operated at a temperature of 80-150° C. (at which temperature the V(III) vanadium ion hydrate is prone to form an oxygen-bridge bond, leading to the production of polycondensation and thus a decreased electrolyte activity), and lacks an activation step. This method can only be used to prepare a negative electrode electrolyte with a narrow application area. Although the industrial high-purity $V_2O_3$ used in the patent has a total vanadium content of 67% (corresponding to a purity of 98.5%), it still contains many impurity ions. Chinese patent CN102468509A discloses a method for preparing a vanadium battery electrolyte, which comprises: preparing $V_2O_3$ by segmented calcination at 200-300° C. and 600-700° C. with ammonium metavanadate and ammonium bicarbonate as raw materials, dissolving $V_2O_3$ in a dilute sulfuric acid and reacting for 5-20 hours at 50-120° C. to obtain a $V_2(SO_4)_3$ solution, and dissolving $V_2O_5$ in the $V_2(SO_4)_3$ solution and reacting for 1-3 hours at 80-110° C. to obtain a vanadium battery electrolyte with an average vanadium ion valence of 3.5. The $V_2(SO_4)_3$ solution is prepared as the negative electrode electrolyte in this patent. The main problem of the method lies in the long-time dissolution operation at a higher temperature (at which temperature the V(III) vanadium ion hydrate is prone to form an oxygen-bridge bond, leading to the production of polycondensation and thus a decreased electrolyte activity), and lack of an activation step; and the purity of the electrolyte is not high. Chinese patent CN103401010A discloses a method for preparing an all-vanadium redox flow battery electrolyte, which comprises: reducing $V_2O_5$ powder in hydrogen to prepare $V_2O_4$ powder and $V_2O_3$ powder, dissolving $V_2O_4$ and $V_2O_3$ in the concentrated sulfuric acid respectively to obtain the positive and negative electrode electrolytes of the vanadium battery. The main problem of the patent lies in that no specific reduction process is provided. The $V_2O_4$ powder is prepared by reducing $V_2O_5$ in hydrogen, however, in the process, over-reduction or under-reduction is prone to occur and the process only can be achieved by precise control, but the patent does not provide measures about the precise control of reduction. In addition, the purity is low. Chinese patents CN101880059A and CN102557134A disclose a fluidized reduction furnace and reduction method for producing high-purity vanadium trioxide, wherein a heat transfer internal member is added in a fluidized bed to achieve the enhanced heat transfer; and cyclone preheating is used to increase the energy utilization rate and realize the efficient preparation of $V_2O_3$. However, since the systems do not have the function of precise control of reduction, the methods described in these two patents are only suitable for the preparation of $V_2O_3$ and not suitable for the preparation of other low-valence vanadium oxides.

In summary, there is an urgent need in the art to solve the disadvantages of the process and technology for preparation of the all-vanadium redox flow battery electrolyte, so as to simplify the preparation process, increase the purity and activity of the electrolyte, and improve the simplicity of electrolyte preparation and use.

SUMMARY

In view of the above problems, the present invention proposes a system and method for producing a high-purity and high-activity vanadium electrolyte, to simplify the preparation process, increase the purity and activity of the electrolyte, and improve the simplicity of electrolyte preparation and use. In order to achieve these objectives, the present invention adopts the following technical solutions.

The present invention provides a system for producing a high-purity and high-activity vanadium electrolyte, comprising a vanadium oxytrichloride storage tank 1, a gas phase ammoniation fluidized bed 2, a reduction fluidized bed 3, a pre-cooling device 4, a secondary cooling device 5, a low-valence vanadium oxide feeding device 6, a dissolution reactor 7 and an activation device 8;

wherein the gas phase ammoniation fluidized bed 2 comprises a vanadium oxytrichloride vaporizer 2-1, a purified ammonia liquor vaporizer 2-2, a chloride spray gun 2-3, a gas phase ammoniation fluidized bed body 2-4, a first cyclone separator 2-5, and an ammonium chloride settling tower 2-6;

the reduction fluidized bed 3 comprises a material valve 3-1, a bed body 3-2, a discharger 3-3, a gas heater 3-4, a gas purifier 3-5, and a second cyclone separator 3-6;

the pre-cooling device 4 comprises a cyclone cooler 4-1 and a third cyclone separator 4-2;

the low-valence vanadium oxide feeding device 6 comprises a low-valence vanadium oxide hopper 6-1 and a low-valence vanadium oxide screw feeder 6-2;

wherein a feed outlet at the bottom of the vanadium oxytrichloride storage tank 1 is connected with a feed inlet of the vanadium oxytrichloride vaporizer 2-1 through a pipeline; the feed inlet of the vanadium oxytrichloride vaporizer 2-1 is connected with a purified nitrogen gas main pipe through a pipeline; a gas outlet of the vanadium oxytrichloride vaporizer 2-1 is connected with a gas inlet of the chloride spray gun 2-3 through a pipeline; a feed inlet of the purified ammonia liquor vaporizer 2-2 is connected with a purified ammonia liquor main pipe and the purified nitrogen gas main pipe through pipelines, respectively; a gas outlet of the purified ammonia liquor vaporizer 2-2 is connected with a gas inlet at the bottom of the gas phase ammoniation fluidized bed body 2-4 through a pipeline; a feed outlet at the upper part of the gas phase ammoniation fluidized bed body 2-4 is connected with a feed inlet of the material valve 3-1 through a pipeline; the first cyclone separator 2-5 is provided at the center of the top of the expansion section of the gas phase ammoniation fluidized bed body 2-4; a gas outlet of the first cyclone separator 2-5 is connected with a gas inlet of the ammonium chloride settling tower 2-6 through a pipeline; and a gas outlet of the ammonium chloride settling tower 2-6 is connected with a gas inlet of a tail gas absorption system through a pipeline;

a feed outlet of the material valve 3-1 is connected with a feed inlet of the bed body 3-2 through a pipeline; an aeration air inlet of the material valve 3-1 is connected with the nitrogen gas main pipe through a pipeline; a feed outlet of the bed body 3-2 is connected with a feed inlet of the discharger 3-3 through a pipeline; a feed outlet of the discharger 3-3 is connected with a feed inlet of the third cyclone separator 4-2 through a pipeline; a gas inlet of the bed body 3-2 is connected with a gas outlet of the gas heater 3-4 through a pipeline; a gas inlet of the gas heater 3-4 is connected with a gas outlet of the gas purifier 3-5 and a gas outlet of the third cyclone separator 4-2 through pipelines, respectively; a combustion air inlet of the gas heater 3-4 is connected with a compressed air main pipe through a pipeline; a fuel inlet of the gas heater 3-4 is connected with a fuel main pipe through a pipeline; a gas inlet of the gas purifier 3-5 is connected with a reducing gas main pipe through a pipeline; the second cyclone separator 3-6 is provided at the center of the top of the expansion section of the bed body 3-2; and a gas outlet of the second cyclone separator 3-6 is connected with the gas inlet at the bottom of the gas phase ammoniation fluidized bed body 2-4 through a pipeline;

a gas inlet of the cyclone cooler 4-1 is connected with the purified nitrogen gas main pipe through a pipeline; a feed outlet of the cyclone cooler 4-1 is connected with a feed inlet of the secondary cooling device 5; a gas outlet of the cyclone cooler 4-1 is connected with a gas inlet of the third cyclone separator 4-2 through a pipeline; and a feed outlet of the third cyclone separator 4-2 is connected with the gas inlet of the cyclone cooler 4-1 through a pipeline;

a feed outlet of the secondary cooling device 5 is connected with a feed inlet of the low-valence vanadium oxide hopper 6-1 through a pipeline; a process water inlet of the secondary cooling device 5 is connected with a process water main pipe through a pipeline; and a process water outlet of the secondary cooling device 5 is connected with a water cooling system through a pipeline;

a feed outlet at the bottom of the low-valence vanadium oxide hopper 6-1 is connected with a feed inlet of the low-valence vanadium oxide screw feeder 6-2; and a feed outlet of the low-valence vanadium oxide screw feeder 6-2 is connected with a feed inlet of the dissolution reactor 7 through a pipeline;

a clean water inlet of the dissolution reactor 7 is connected with a clean water main pipe through a pipeline; a sulfuric acid inlet of the dissolution reactor 7 is connected with a sulfuric acid main pipe through a pipeline; a gas outlet of the dissolution reactor 7 is connected with a gas inlet of the tail gas absorption system through a pipeline; and a primary electrolyte outlet of the dissolution reactor 7 is connected with an electrolyte inlet of the activation device 8 through a pipeline.

The present invention further provides a method for producing a high-purity and high-activity vanadium electrolyte based on the above system, which comprises the following steps:

allowing vanadium oxytrichloride in the vanadium oxytrichloride storage tank 1 and nitrogen gas from the purified nitrogen gas main pipe to be vaporized and preheated by the vanadium oxytrichloride vaporizer 2-1, and then enter the gas phase ammoniation fluidized bed body 2-4 through the chloride spray gun 2-3; allowing purified ammonia liquor and purified nitrogen gas to be vaporized and preheated by the purified ammonia liquor vaporizer 2-2 and then be merged with high-temperature tail gas from the second cyclone separator 3-6 of the reduction fluidized bed, and be transmitted together into the gas phase ammoniation fluidized bed body 2-4, such that vanadium oxytrichloride is ammoniated and the powder material is kept at a fluidized state, to form ammonium salt powder and flue gas rich in ammonium chloride; discharging the ammonium salt powder into the bed body 3-2 through the material valve 3-1; and allowing the flue gas to be subjected to dust removing by the first cyclone separator 2-5, and then enter the ammonium chloride settling tower 2-6, and transmitting the tail gas after settlement to the tail gas absorption system;

allowing the purified nitrogen gas from the purified nitrogen gas main pipe to enter the cyclone cooler 4-1 and the third cyclone separator 4-2 in turn and then be merged with the reducing gas purified by the gas purifier 3-5, and allowing the gas mixture to be preheated by the gas heater 3-4 and then be transmitted into the bed body 3-2, such that the ammonium salt is subjected to reduction reaction and the powder material is kept at a fluidized state, and allowing the formed flue gas to be subjected to dust removing by the second cyclone separator 3-6 and then be merged with the gas from the purified ammonia liquor vaporizer 2-2, and be transmitted together into the gas phase ammoniation fluidized bed body 2-4; allowing the formed low-valence vanadium oxide to enter the discharger 3-3, the third cyclone separator 4-2, the cyclone cooler 4-1, the secondary cooling device 5, the low-valence vanadium oxide hopper 6-1 in turn, and enter the dissolution reactor 7 through the low-valence vanadium oxide screw feeder 6-2, and then undergo dissolution reaction together with clean water from the clean water main pipe and sulfuric acid from the sulfuric acid main pipe to obtain a primary vanadium electrolyte; transmitting the produced acid mist gas to the tail gas treatment system; and activating the primary electrolyte by the activation device 8 to obtain the high-purity and high-activity vanadium electrolyte.

The first characteristic of the present invention lies in that: the raw material of vanadium oxytrichloride has a purity of 99%-99.9999%, i.e., 2N-6N.

The second characteristic of the present invention lies in that: in the vanadium oxytrichloride vaporizer 2-1, the operation temperature is 40-240° C., and the molar ratio of nitrogen gas to vanadium oxytrichloride is 0.10-10.00 in the vaporization.

The third characteristic of the present invention lies in that: in the purified ammonia liquor vaporizer 2-2, the operation temperature is 40-240° C., the mass ratio of nitrogen gas to ammonia liquor is 0.10-10.00, and the concentration of ammonia liquor is 15 mol/L in the vaporization.

The fourth characteristic of the present invention lies in that: in the gas phase ammoniation fluidized bed body 2-4, the ammonium salt containing vanadium is prepared by gas phase ammoniation of vanadium oxytrichloride, and during the gas phase ammoniation, the mass ratio of the introduced ammonia liquor to vanadium oxytrichloride is 1.00-10.00, the operation temperature is 350-450° C., and the average residence time of the powder is 30-180 min.

The fifth characteristic of the present invention lies in that: in the gas phase ammoniation fluidized bed body 2-4, the generated ammonium salt is one or more of ammonium polyvanadate, ammonium metavanadate and ammonium chloride.

The sixth characteristic of the present invention lies in that: in the reduction fluidized bed body 3-2, the operation temperature is 450-700° C. in the reduction, and after the reducing gas is purified by the purifier 3-5, the content of organic substances is less than 1 mg/Nm$^3$, the total solid particle content is less than 2 mg/Nm$^3$, the volume fraction of the reducing gas in the mixed gas of the introduced nitrogen gas and reducing gas is 10%-90%, and the average residence time of the powder is 30-90 min.

The seventh characteristic of the present invention lies in that: the vanadium electrolyte is a mixed electrolyte with the molar concentration ratio of vanadium ions V(III) to V(IV) of 1:1, and the average valence of the vanadium ions is 3.5, and the vanadium electrolyte can be directly used in a new all-vanadium redox flow battery stack.

The eighth characteristic of the present invention lies in that: in the dissolution and activation device 8, the vanadium ions are activated by means of ultrasound, and the dissolution and activation time is 30-300 minutes and the dissolution and activation temperature is 20-45° C., the power density of microwave is 10-300 W/L, and the frequency of microwave is 28 KHz, 40 KHz or 60 KHz.

The electrolyte produced by the present invention is of high purity, high activity and simple assembly. The present invention has the following outstanding advantages:

(1) High purity: vanadium oxytrichloride which is easy to be highly purified is used as a raw material, and it is easy to obtain high-purity vanadium oxytrichloride with a purity of 2N-6N. Taking 5N vanadium oxytrichloride for example, a low-valence vanadium oxide with a purity of 4N5 (i.e., a purity of 99.995%) can be prepared by the present invention, and therefore a high-purity electrolyte can be formulated. In addition to the effective components, the total impurity content is lower than 5 ppm.

(2) Fluidized gas phase ammoniation: the process is short and the production is large, which is convenient for industrial application.

(3) Precise control of reduction: a rectangular multi-bin fluidized bed is used to achieve precise control over reduction of the valence state.

(4) Achieving the recycling of high-temperature ammonia-rich tail gas from the reduction fluidized bed: by making the high-temperature tail gas produced from the reduction fluidized bed enter the gas phase ammoniation fluidized bed through a pipeline, the sensible heat of the high-temperature tail gas can be recovered while the recycling of ammonia gas is achieved.

(5) High activity: the vanadium ions are activated by ultrasonication, thereby significantly increasing the activity of the electrolyte.

(6) Convenient transportation: the process for producing the electrolyte is short, and suitable for on-site configuration of vanadium batteries, and the low-valence vanadium oxide can be transported, thereby greatly reducing the transportation cost.

(7) 3.5-valence electrolyte: the electrolyte is suitable for configuration of a new vanadium battery stack, and can be directly added to positive and negative electrode chambers for use, which is simple to operate.

The present invention has the advantages of low energy consumption in production and low operation cost, high product purity, stable quality, simple electrolyte preparation and assembly and so on, and is suitable for the large-scale industrial production of the all-vanadium redox flow battery electrolyte, with good economic and social benefits.

BRIEF DESCRIPTION OF THE DRAWINGS

The accompanying drawing is used to provide further illustration of the present invention and constitutes a part of the specification. It is used to explain the present invention together with the examples of the present invention, rather than limit the present invention.

FIG. 1 is a schematic diagram illustrating the configuration of a system for producing a high-purity and high-activity vanadium electrolyte according to the present invention.

DETAILED DESCRIPTION OF THE EMBODIMENTS

In order to make the object, technical solution, and advantages of the present invention be clearer, the technical solution in the examples of the present invention will be described clearly and completely below with reference to the accompanying drawing of the present invention.

Obviously, the described examples are only a part of the examples of the present invention, not all examples. It is worth noting that the examples are merely used for illustrating the technical solution of the present invention, rather than limiting the present invention. FIG. 1 is a schematic diagram illustrating the configuration of a system for producing a high-purity and high-activity vanadium electrolyte according to the present invention.

FIG. 1 includes the following designators:
1 Vanadium oxytrichloride storage tank.
2 Gas phase ammoniation fluidized bed.
2-1 Vanadium oxytrichloride vaporizer.
2-2 Purified ammonia liquor vaporizer.
2-3 Chloride spray gun.
2-4 Gas phase ammoniation fluidized bed body.
2-5 First cyclone separator.
2-6 Ammonium chloride settling tower.
3 Reduction fluidized bed.
3-1 Material valve.
3-2 Bed body.
3-3 Discharger.
3-4 Gas heater.
29
3-5 Gas purifier.
3-6 Second cyclone separator.
4 Pre-cooling device.
4-1 Cyclone cooler.
4-2 Third cyclone separator.
5 Secondary cooling device.
6 Low-valence vanadium oxide feeding device.
6-1 Low-valence vanadium oxide hopper.
6-2 Low-valence vanadium oxide screw feeder.
7 Dissolution reactor.
8 Activation device.

Example 1

With reference to FIG. 1, the system for producing a 3.5-valence high-purity vanadium electrolyte used in this example comprises a vanadium oxytrichloride storage tank 1, a gas phase ammoniation fluidized bed 2, a reduction fluidized bed 3, a pre-cooling device 4, a secondary cooling device 5, a low-valence vanadium oxide feeding device 6, a dissolution reactor 7 and an activation device 8.

The gas phase ammoniation fluidized bed 2 comprises a vanadium oxytrichloride vaporizer 2-1, a purified ammonia liquor vaporizer 2-2, a chloride spray gun 2-3, a gas phase ammoniation fluidized bed body 2-4, a first cyclone separator 2-5, and an ammonium chloride settling tower 2-6.

The reduction fluidized bed 3 comprises a material valve 3-1, a bed body 3-2, a discharger 3-3, a gas heater 3-4, a gas purifier 3-5, and a second cyclone separator 3-6.

The pre-cooling device 4 comprises a cyclone cooler 4-1 and a third cyclone separator 4-2.

The low-valence vanadium oxide feeding device 6 comprises a low-valence vanadium oxide hopper 6-1 and a low-valence vanadium oxide screw feeder 6-2.

A feed outlet at the bottom of the vanadium oxytrichloride storage tank 1 is connected with a feed inlet of the vanadium oxytrichloride vaporizer 2-1 through a pipeline; the feed inlet of the vanadium oxytrichloride vaporizer 2-1 is connected with a purified nitrogen gas main pipe through a pipeline; a gas outlet of the vanadium oxytrichloride vaporizer 2-1 is connected with a gas inlet of the chloride spray gun 2-3 through a pipeline; a feed inlet of the purified ammonia liquor vaporizer 2-2 is connected with a purified ammonia liquor main pipe and the purified nitrogen gas main pipe through pipelines, respectively; a gas outlet of the purified ammonia liquor vaporizer 2-2 is connected with a gas inlet at the bottom of the gas phase ammoniation fluidized bed body 2-4 through a pipeline; a feed outlet at the upper part of the gas phase ammoniation fluidized bed body 2-4 is connected with a feed inlet of the material valve 3-1 through a pipeline; the first cyclone separator 2-5 is provided at the center of the top of the expansion section of the gas phase ammoniation fluidized bed body 2-4; a gas outlet of the first cyclone separator 2-5 is connected with a gas inlet of the ammonium chloride settling tower 2-6 through a pipeline; and a gas outlet of the ammonium chloride settling tower 2-6 is connected with a gas inlet of a tail gas absorption system through a pipeline.

A feed outlet of the material valve 3-1 is connected with a feed inlet of the bed body 3-2 through a pipeline; an aeration air inlet of the material valve 3-1 is connected with the nitrogen gas main pipe through a pipeline; a feed outlet of the bed body 3-2 is connected with a feed inlet of the discharger 3-3 through a pipeline; a feed outlet of the discharger 3-3 is connected with a feed inlet of the third cyclone separator 4-2 through a pipeline; a gas inlet of the bed body 3-2 is connected with a gas outlet of the gas heater 3-4 through a pipeline; a gas inlet of the gas heater 3-4 is connected with a gas outlet of the gas purifier 3-5 and a gas outlet of the third cyclone separator 4-2 through pipelines, respectively; a combustion air inlet of the gas heater 3-4 is connected with a compressed air main pipe through a pipeline; a fuel inlet of the gas heater 3-4 is connected with a fuel main pipe through a pipeline; a gas inlet of the gas purifier 3-5 is connected with a reducing gas main pipe through a pipeline; the second cyclone separator 3-6 is provided at the center of the top of the expansion section of the bed body 3-2; and a gas outlet of the second cyclone separator 3-6 is connected with the gas inlet at the bottom of the gas phase ammoniation fluidized bed body 2-4 through a pipeline.

A gas inlet of the cyclone cooler 4-1 is connected with the purified nitrogen gas main pipe through a pipeline; a feed outlet of the cyclone cooler 4-1 is connected with a feed inlet of the secondary cooling device 5; a gas outlet of the cyclone cooler 4-1 is connected with a gas inlet of the third cyclone separator 4-2 through a pipeline; and a feed outlet of the third cyclone separator 4-2 is connected with the gas inlet of the cyclone cooler 4-1 through a pipeline.

A feed outlet of the secondary cooling device 5 is connected with a feed inlet of the low-valence vanadium oxide hopper 6-1 through a pipeline; a process water inlet of the secondary cooling device 5 is connected with a process water main pipe through a pipeline; and a process water outlet of the secondary cooling device 5 is connected with a water cooling system through a pipeline.

A feed outlet at the bottom of the low-valence vanadium oxide hopper 6-1 is connected with a feed inlet of the low-valence vanadium oxide screw feeder 6-2; and a feed outlet of the low-valence vanadium oxide screw feeder 6-2 is connected with a feed inlet of the dissolution reactor 7 through a pipeline.

A clean water inlet of the dissolution reactor 7 is connected with a clean water main pipe through a pipeline; a sulfuric acid inlet of the dissolution reactor 7 is connected with a sulfuric acid main pipe through a pipeline; a gas outlet of the dissolution reactor 7 is connected with a gas inlet of the tail gas absorption system through a pipeline; and a primary electrolyte outlet of the dissolution reactor 7 is connected with an electrolyte inlet of the activation device 8 through a pipeline.

Example 2

The above system is used in this example to produce a high-purity and high-activity vanadium electrolyte. The method specifically comprises the following steps.

Vanadium oxytrichloride in the vanadium oxytrichloride storage tank 1 and nitrogen gas from the purified nitrogen gas main pipe are vaporized and preheated by the vanadium oxytrichloride vaporizer 2-1, and then enter the gas phase ammoniation fluidized bed body 2-4 through the chloride spray gun 2-3. Purified ammonia liquor and purified nitrogen gas are vaporized and preheated by the purified ammonia liquor vaporizer 2-2, and then merged with high-temperature tail gas from the second cyclone separator 3-6 of the reduction fluidized bed, and transmitted together into the gas phase ammoniation fluidized bed body 2-4, such that vanadium oxytrichloride is ammoniated and the powder material is kept at a fluidized state, to form ammonium salt powder and flue gas rich in ammonium chloride. The ammonium salt powder is discharged into the bed body 3-2 through the material valve 3-1. The flue gas is subjected to dust removing by the first cyclone separator 2-5, and then enters the ammonium chloride settling tower 2-6, and the tail gas after settlement is transmitted to the tail gas absorption system.

The purified nitrogen gas from the purified nitrogen gas main pipe enters the cyclone cooler 4-1 and the third cyclone separator 4-2 in turn, and then is merged with the reducing gas purified by the gas purifier 3-5; and the gas mixture is preheated by the gas heater 3-4 and then transmitted into the bed body 3-2, such that the ammonium salt is subjected to reduction reaction and the powder material is kept at a fluidized state; and the formed flue gas is subjected to dust removing by the second cyclone separator 3-6, and then merged with the gas from the purified ammonia liquor vaporizer 2-2, and transmitted together into the gas phase ammoniation fluidized bed body 2-4. The formed low-valence vanadium oxide enters the discharger 3-3, the third cyclone separator 4-2, the cyclone cooler 4-1, the secondary cooling device 5, the low-valence vanadium oxide hopper 6-1 in turn, and enters the dissolution reactor 7 through the low-valence vanadium oxide screw feeder 6-2, and then undergoes dissolution reaction together with clean water from the clean water main pipe and sulfuric acid from the sulfuric acid main pipe to obtain a primary vanadium electrolyte. The produced acid mist gas is transmitted to the tail gas treatment system. The primary electrolyte is activated by the activation device 8 to obtain the high-purity and high-activity vanadium electrolyte.

Example 3

In this example, vanadium oxytrichloride (with a purity of above 2N) was used as a raw material, and the throughput was 3 kg/h. In the vanadium oxytrichloride vaporizer 2-1, the operation temperature was 40° C., and the molar ratio of nitrogen gas to vanadium oxytrichloride was 10:1 in the vaporization. In the purified ammonia liquor vaporizer 2-2, the operation temperature was 40° C., and the mass ratio of nitrogen gas to ammonia liquor was 10:1 in the vaporization. In the gas phase ammoniation fluidized bed body 2-4, the mass ratio of ammonia liquor to vanadium oxytrichloride was 10:1 during the gas phase ammoniation, the operation temperature was 350° C. and the average residence time of the powder was 180 min in the gas phase ammoniation, and an ammonium salt containing vanadium was obtained. In the reduction fluidized bed 3, the reducing gas introduced was hydrogen gas, the volume fraction of hydrogen gas in the mixed gas of the nitrogen gas and hydrogen gas introduced into the reduction fluidized bed 3 was 10%, the average residence time of the powder was 90 min, and the operation temperature was 350 OC, and a low-valence vanadium oxide having an average vanadium valence of 3.5 and a purity of 98.5% was obtained. Electronic-grade concentrated sulfuric acid and clean water (having a resistivity of 15.0 MΩ·cm) were added, and the dissolving temperature was set to be 90° C. to obtain a primary electrolyte. In the activation device 8, activation was conducted for 300 minutes at a temperature of 20° C., with an ultrasonic power density of 10 W/L and a frequency of 28 KHz, to obtain a vanadium electrolyte with a total impurity content of less than 0.5% (except for the effective components).

Example 4

In this example, vanadium oxytrichloride (with a purity of above 3N) was used as a raw material, and the throughput was 30 kg/h. In the vanadium oxytrichloride vaporizer 2-1, the operation temperature was 240° C., and the molar ratio of nitrogen gas to vanadium oxytrichloride was 1:10 in the vaporization. In the purified ammonia liquor vaporizer 2-2, the operation temperature was 240 OC, and the mass ratio of nitrogen gas to ammonia liquor was 1:10 in the vaporization. In the gas phase ammoniation fluidized bed body 2-4, the mass ratio of ammonia liquor to vanadium oxytrichloride was 1:1 during the gas phase ammoniation, the operation temperature was 450° C. and the average residence time of the powder was 30 min in the gas phase ammoniation, and an ammonium salt containing vanadium was obtained. In the reduction fluidized bed 3, the reducing gas was coal gas, the volume fraction of coal gas in the mixed gas of coal gas and nitrogen gas was 90%, the average residence time of the powder was 30 min, and the operation temperature was 700° C. in the reduction fluidized bed, and a low-valence vanadium oxide having an average vanadium valence of 3.5 and a purity of 99.5% was obtained. Electronic-grade concentrated sulfuric acid and clean water (having a resistivity of 18.0 MΩ·cm) were added, and the dissolving temperature was set to be 90° C. to obtain a primary electrolyte. In the activation device 8, activation was conducted for 30 minutes at a temperature of 45° C., with an ultrasonic power density of 300 W/L and a frequency of 40 KHz, to obtain a high-purity vanadium electrolyte with a total impurity content of less than 0.05% (except for the effective components).

Example 5

In this example, vanadium oxytrichloride (with a purity of above 4N) was used as a raw material, and the throughput was 300 kg/h. In the vanadium oxytrichloride vaporizer 2-1, the operation temperature was 200 OC, and the molar ratio of nitrogen gas to vanadium oxytrichloride was 1:5 in the vaporization. In the purified ammonia liquor vaporizer 2-2, the operation temperature was 200 OC, and the mass ratio of nitrogen gas to ammonia liquor was 1:5 in the vaporization. In the gas phase ammoniation fluidized bed body 2-4, the mass ratio of ammonia liquor to vanadium oxytrichloride was 1:5 during the gas phase ammoniation, the operation temperature was 400° C. and the average residence time of the powder was 30 min in the gas phase ammoniation, and an ammonium salt containing vanadium was obtained. In the reduction fluidized bed 3, the reducing gas was coal gas, the volume fraction of coal gas in the mixed gas of coal gas and nitrogen gas was 90%, the average residence time of the powder was 45 min, and the operation temperature was 600° C. in the reduction fluidized bed, and a low-valence vanadium oxide having an average vanadium valence of 3.5 and a purity of 99.95% was obtained. Electronic-grade concentrated sulfuric acid and clean water (having a resistivity of 18.0 M.*cm) were added, and the dissolving temperature was set to be 90° C. to obtain a primary electrolyte. In the activation device 8, activation was conducted for 200 minutes at a temperature of 35° C., with an ultrasonic power density of 200 W/L and a frequency of 60 KHz, to obtain a high-purity vanadium electrolyte with a total impurity content of less than 0.005% (except for the effective components).

Example 6

In this example, vanadium oxytrichloride (with a purity of above 5N) was used as a raw material, and the throughput was 3000 kg/h. In the vanadium oxytrichloride vaporizer 2-1, the operation temperature was 210° C., and the molar ratio of nitrogen gas to vanadium oxytrichloride was 1:1 in the vaporization. In the purified ammonia liquor vaporizer 2-2, the operation temperature was 210° C., and the mass ratio of nitrogen gas to ammonia liquor was 1:2 in the vaporization. In the gas phase ammoniation fluidized bed body 2-4, the mass ratio of ammonia liquor to vanadium oxytrichloride was 1:3 during the gas phase ammoniation, the operation temperature was 450° C. and the average residence time of the powder was 60 min in the gas phase ammoniation, and an ammonium salt containing vanadium was obtained. In the reduction fluidized bed 3, the reducing gas was hydrogen gas, the volume fraction of hydrogen gas in the mixed gas of hydrogen gas and nitrogen gas was 90%, the average residence time of the powder was 60 min, and the operation temperature was 550° C. in the reduction fluidized bed, and a low-valence vanadium oxide having an average vanadium valence of 3.5 and a purity of 4N5 (i.e., a purity of 99.995%) was obtained. Electronic-grade concentrated sulfuric acid and clean water (having a resistivity of 18.0 M.*cm) were added, and the dissolving temperature was set to be 80° C. to obtain a primary electrolyte. In the activation device 8, activation was conducted for 100 minutes at a temperature of 25 OC, with an ultrasonic power density of 100 W/L and a frequency of 40 KHz, to obtain a high-purity vanadium electrolyte with a total impurity content of less than 5 ppm (except for the effective components).

Example 7

In this example, vanadium oxytrichloride (with a purity of above 6N) was used as a raw material, and the throughput was 3000 kg/h. In the vanadium oxytrichloride vaporizer 2-1, the operation temperature was 210° C., and the molar ratio of nitrogen gas to vanadium oxytrichloride was 1:1 in the vaporization. In the purified ammonia liquor vaporizer 2-2, the operation temperature was 210° C., and the mass ratio of nitrogen gas to ammonia liquor was 1:2 in the vaporization. In the gas phase ammoniation fluidized bed body 2-4, the mass ratio of ammonia liquor to vanadium oxytrichloride was 1:3 during the gas phase ammoniation, the operation temperature was 450° C. and the average residence time of the powder was 60 min in the gas phase ammoniation, and an ammonium salt containing vanadium was obtained. In the reduction fluidized bed 3, the reducing gas was hydrogen gas, the volume fraction of hydrogen gas in the mixed gas of hydrogen gas and nitrogen gas was 90%, the average residence time of the powder was 60 min, and the operation temperature was 550° C. in the reduction fluidized bed, and a low-valence vanadium oxide having an average vanadium valence of 3.5 and a purity of 5N5 (i.e., a purity of 99.9995%) was obtained. Electronic-grade concentrated sulfuric acid and clean water (having a resistivity of 18.0 MΩ·cm) were added, and the dissolving temperature was set to be 80° C. to obtain a primary electrolyte. In the activation device 8, activation was conducted for 100 minutes at a temperature of 25° C., with an ultrasonic power density of 100 W/L and a frequency of 40 KHz, to obtain a high-purity vanadium electrolyte with a total impurity content of less than 1 ppm (except for the effective components).

The contents which are not illustrated in detail in the present invention belong to the well-known technologies in the art.

Of course, the present invention can also provide a variety of examples. According to the disclosure of the present invention, those skilled in the art can make various corresponding changes and transformations without departing from the spirit and essence of the present invention. However, these corresponding changes and transformations shall all fall within the protection scope of the claims of the present invention.

What is claimed is:

1. A system for producing a high-purity and high-activity vanadium electrolyte, comprising a vanadium oxytrichloride storage tank a gas phase ammoniation fluidized bed, a reduction fluidized bed, a pre-cooling device, a secondary cooling device, a low-valence vanadium oxide feeding device, a dissolution reactor, and an activation device;
wherein the gas phase ammoniation fluidized bed comprises a vanadium oxytrichloride vaporizer, a purified ammonia liquor vaporizer, a chloride spray gun, a gas phase ammoniation fluidized bed body, a first cyclone separator, and an ammonium chloride settling tower;
the reduction fluidized bed comprises a material valve, a bed body, a discharger, a gas heater, a gas purifier, and a second cyclone separator;
the pre-cooling device comprises a cyclone cooler and a third cyclone separator;
the low-valence vanadium oxide feeding device comprises a low-valence vanadium oxide hopper and a low-valence vanadium oxide screw feeder;
wherein a feed outlet at the bottom of the vanadium oxytrichloride storage tank is connected with a feed inlet of the vanadium oxytrichloride vaporizer through a pipeline; the feed inlet of the vanadium oxytrichloride vaporizer is connected with a purified nitrogen gas main pipe through a pipeline; a gas outlet of the vanadium oxytrichloride vaporizer is connected with a gas inlet of the chloride spray gun through a pipeline; a feed inlet of the purified ammonia liquor vaporizer is connected with a purified ammonia liquor main pipe and the purified nitrogen gas main pipe through pipelines; respectively; a gas outlet of the purified ammonia liquor vaporizer is connected with a gas inlet at the bottom of the gas phase ammoniation fluidized bed body through a pipeline; a feed outlet at the upper part of the gas phase ammoniation fluidized bed body is connected with a feed inlet of the material valve through a pipeline; the first cyclone separator is provided at the center of the top of the expansion section of the gas phase ammoniation fluidized bed body; a gas outlet of the first cyclone separator is connected with a gas inlet of the ammonium chloride settling tower through a pipeline; and a gas outlet of the ammonium chloride settling tower is connected with a gas inlet of a tail gas absorption system through a pipeline;
a feed outlet of the material valve is connected with a feed inlet of the bed body through a pipeline; an aeration air inlet of the material valve is connected with the nitrogen gas main pipe through a pipeline; a feed outlet of the bed body is connected with a feed inlet of the discharger through a pipeline; a feed outlet of the discharger is connected with a feed inlet of the third cyclone separator through a pipeline; a gas inlet of the bed body is connected with a gas outlet of the gas heater through a pipeline; a gas inlet of the gas heater is connected with a gas outlet of the gas purifier and a gas outlet of the third cyclone separator through pipelines, respectively; a combustion air inlet of the gas heater connected with a compressed air main pipe through a pipeline; a fuel inlet of the gas heater is connected with a fuel main pipe through a pipeline; a gas inlet of the gas purifier is connected with a reducing gas main pipe through a pipeline; the second cyclone separator is provided at the center of the top of the expansion section of the bed body; and a gas outlet of the second cyclone separator is connected with the gas inlet at the bottom of the gas phase ammoniation fluidized bed body through a pipeline;
a gas inlet of the cyclone cooler is connected with the purified nitrogen gas main pipe through a pipeline; a feed outlet of the cyclone cooler is connected with a feed inlet of the secondary cooling device; a gas outlet of the cyclone cooler is connected with a gas inlet of the third cyclone separator through a pipeline; and a feed outlet of the third cyclone separator is connected with the gas inlet of the cyclone cooler through a pipeline;
a feed outlet of the secondary cooling device is connected with a feed inlet of the low-valence vanadium oxide hopper through a pipeline; a process water inlet of the secondary cooling device is connected with a process water main pipe through a pipeline; and a process water outlet of the secondary cooling device is connected with a water cooling system through a pipeline;
a feed outlet at the bottom of the low-valence vanadium oxide hopper is connected with a feed inlet of the low-valence vanadium oxide screw feeder; and a feed outlet of the low-valence vanadium oxide screw feeder is connected with a feed inlet of the dissolution reactor through a pipeline;
a clean water inlet of the dissolution reactor is connected with a clean water main pipe through a pipeline; a sulfuric acid inlet of the dissolution reactor is connected with a sulfuric acid main pipe through a pipeline; a gas outlet of the dissolution reactor is connected with a gas inlet of the tail gas absorption system through a pipeline; and a primary electrolyte outlet of the dissolution reactor is connected with an electrolyte inlet of the activation device through a pipeline.

2. A method for producing a high-purity and high-activity vanadium electrolyte according to the system of claim 1, comprising the following steps:
introducing vanadium oxytrichloride into the vanadium oxytrichloride storage tank and the nitrogen gas from the purified nitrogen gas main pipe to be vaporized and preheated by the vanadium oxytrichloride vaporizer, and then enter the gas phase ammoniation fluidized bed body through the chloride spray gun; passing the purified ammonia liquor and purified nitrogen gas to be vaporized and preheated by the purified ammonia liquor vaporizer and then be merged with high-temperature tail gas from the second cyclone separator of the reduction fluidized bed, and be transmitted together into the gas phase ammoniation fluidized bed body, such that vanadium oxytrichloride is ammoniated and the powder material is kept at a fluidized state, to form ammonium salt powder and flue gas rich in ammonium chloride; discharging the ammonium salt powder into the bed body through the material valve; and moving the flue gas to be subjected to dust removing by the first cyclone separator, and then entering the ammonium chloride settling tower, and transmitting the tail gas after settlement to the tail gas absorption system;

moving the purified nitrogen gas from the purified nitrogen gas main pipe into the cyclone cooler and the third cyclone separator and then merged with the reducing gas purified by the gas purifier; and preheating the gas mixture by the gas heater and then transmitted into the bed body, such that the ammonium salt is subjected to a reduction reaction wherein the powder material is kept at a fluidized state, and the formed flue gas is subjected to dust removing by the second cyclone separator and then merged with the gas from the purified ammonia liquor vaporizer, and transmitted together into the gas phase ammoniation fluidized bed body; wherein the formed low-valence vanadium oxide is transmitted to the discharger, the third cyclone separator, the cyclone cooler, the secondary cooling device, the low-valence vanadium oxide hopper, and transmitted to the dissolution reactor through the low-valence vanadium oxide screw feeder to undergo dissolution reaction together with clean water from the clean water main pipe and sulfuric acid from the sulfuric acid main pipe to obtain a primary vanadium electrolyte; and transmitting the produced acid mist gas to the tail gas treatment system; and activating the primary electrolyte by the activation device to obtain the vanadium electrolyte.

3. The method for producing a high-purity and high-activity vanadium electrolyte according to claim 2, wherein the raw material of vanadium oxytrichloride has a purity of 99%-99.9999%.

4. The method for producing a high-purity and high-activity vanadium electrolyte according to claim 2, wherein in the vanadium oxytrichloride vaporizer the operation temperature is 40-240° C., and the molar ratio of nitrogen gas to vanadium oxytrichloride is 0.10-10.00 in the vaporization.

5. The method for producing a high-purity and high-activity vanadium electrolyte according to claim 2, wherein in the purified ammonia liquor vaporizer, the operation temperature is 40-240° C., and the mass ratio of nitrogen gas to ammonia liquor is 0.10-10.00 in the vaporization.

6. The method for producing a high-purity and high-activity vanadium electrolyte according to claim 2, wherein in the gas phase ammoniation fluidized bed body the ammonium salt containing vanadium is prepared by gas phase ammoniation of vanadium oxytrichloride, and during the gas phase ammoniation, the mass ratio of the introduced ammonia liquor to vanadium oxytrichloride is 1.00-10.00, the operation temperature is 350-450° C., and the average residence time of the powder is 30-180 min.

7. The method for producing a high-purity and high-activity vanadium electrolyte according to claim 2, wherein in the gas phase ammoniation fluidized bed body, the generated ammonium salt is one or more of ammonium polyvanadate, ammonium metavanadate and ammonium chloride.

8. The method for producing a high-purity and high-activity vanadium electrolyte according to claim 2, wherein in the reduction fluidized bed body, the operation temperature is 450-700° C. in the reduction, and after the reducing gas is purified by the purifier, the content of organic substances is less than 1 mg/Nm$^3$, the total solid particle content is less than 2 mg/Nm$^3$, the volume fraction of the reducing gas in the mixed gas of the introduced nitrogen gas and reducing gas is 10%-90%, and the average residence time of the powder is 30-90 min.

9. The method for producing a high-purity and high-activity vanadium electrolyte according to claim 2, wherein the vanadium electrolyte is a mixed electrolyte with the molar concentration ratio of vanadium ions V(III) to V(IV) of 1:1, and the average valence of the vanadium ions is 3.5.

10. The method for producing a high-purity and high-activity vanadium electrolyte according to claim 2, wherein in the activation device, the vanadium ions are activated by means of ultrasound, and the dissolution and activation time is 30-300 minutes and the dissolution and activation temperature is 20-45° C., the power density is 10-300 W/L, and the frequency is 28 KHz, 40 KHz or 60 KHz.

* * * * *